(No Model.) 2 Sheets—Sheet 1.
W. H. JOHNSON.
FRICTION CLUTCH.
No. 394,367. Patented Dec. 11, 1888.
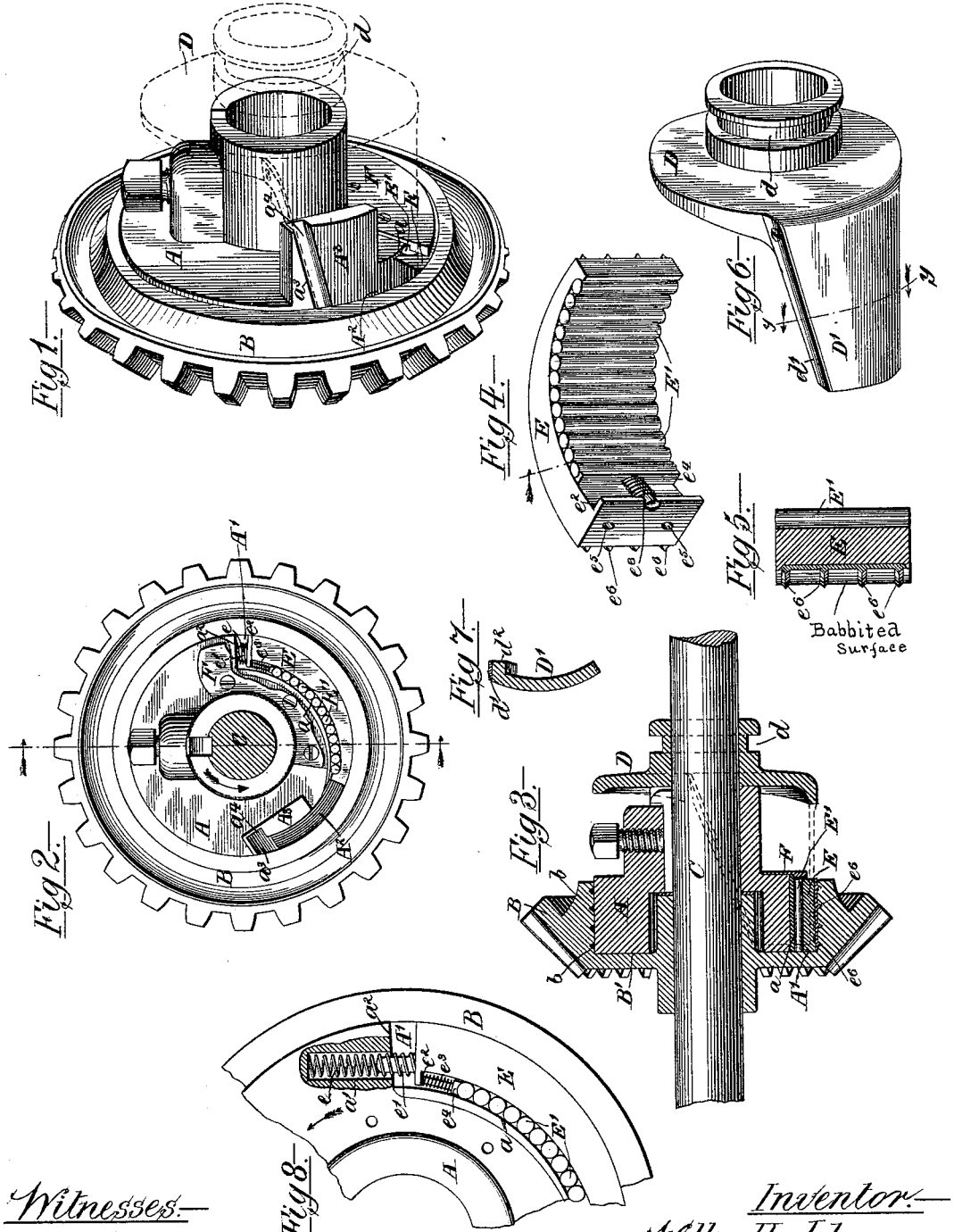
Witnesses:
Wm. F. Henning.
Louis M. F. Whitehead.
Inventor:
Willis H. Johnson.
by Dayton & Poole
Attorneys.

(No Model.) 2 Sheets—Sheet 2.
W. H. JOHNSON.
FRICTION CLUTCH.
No. 394,367. Patented Dec. 11, 1888.
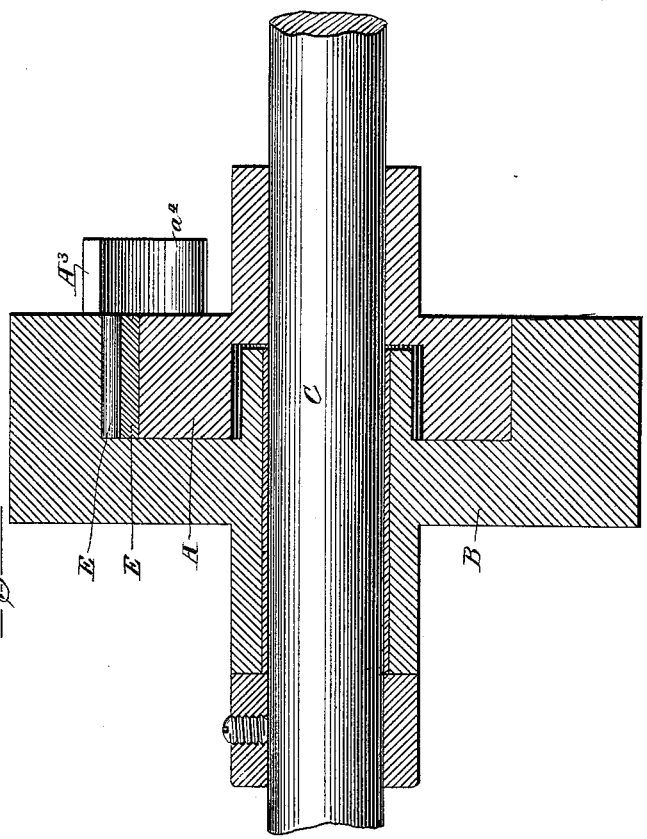
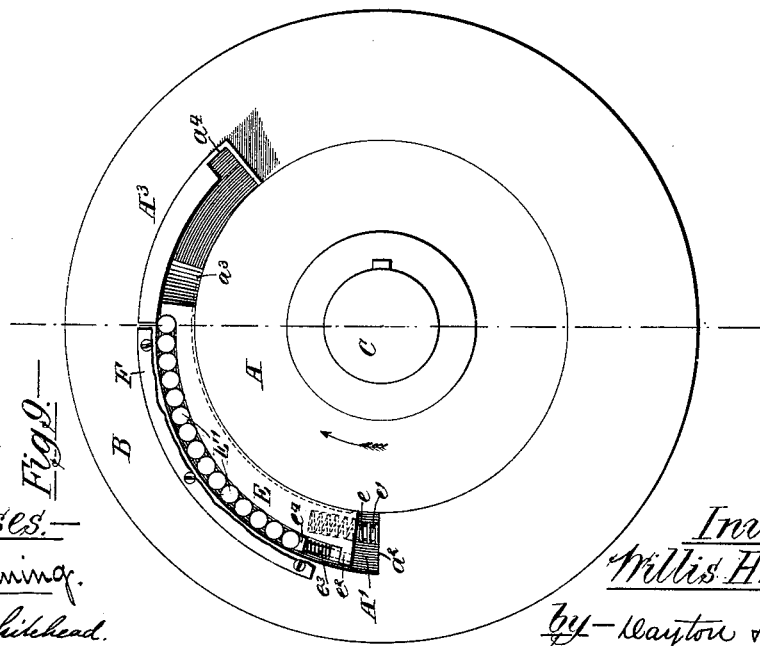
Witnesses—
Wm. T. Henning.
Louis M. T. Whitehead.
Inventor—
Willis H. Johnson.
By—Dayton & Poole
Attorneys.

UNITED STATES PATENT OFFICE.

WILLIS H. JOHNSON, OF SPRINGFIELD, ILLINOIS, ASSIGNOR OF ONE-HALF TO CHARLES A. ORR AND HARRY L. IDE, BOTH OF SAME PLACE.

FRICTION-CLUTCH.

SPECIFICATION forming part of Letters Patent No. 394,367, dated December 11, 1888.

Application filed September 20, 1887. Serial No. 250,160. (No model.)

*To all whom it may concern:*

Be it known that I, WILLIS H. JOHNSON, of Springfield, in the county of Sangamon and State of Illinois, have invented certain new and useful Improvements in Friction-Clutches; and I do hereby declare that the following is a full, clear, and exact description thereof, reference being had to the accompanying drawings, and to the letters of reference marked thereon, which form a part of this specification.

This invention relates to a class of friction-clutches in which the principal members have a fixed relation to each other and in which the clutching action is accomplished by means of a movable part arranged in a tapering recess in the surface of one of said members contiguous or adjacent to a surface of the other member.

The invention is herein shown as being embodied in a clutch in which one of the members runs in a recess contained in the other member and in which the movable clutching part works in connection with the peripheral surfaces of the members which are in contact or adjacent to each other.

In another application for patent, originally filed January 26, 1887, Serial No. 225,585, and since renewed under date September 20, 1887, with the Serial No. 250,258, I have shown a clutch of this description, in which a tapering recess in one of the members contains one or more rollers of less diameter than the wider part of the recess and of greater diameter than the narrower part of said recess, in combination with devices for shifting the rollers back and forth in a recess to engage the members of the clutch, or to disengage them, as occasion may require. This present invention may be regarded as an improvement in the clutch described in said former application for patent, the essential feature of difference being that in the present case a solid movable wedge is employed in place of the roller or rollers of the former application, whereby a greater bearing-surface of the movable part within the recess is obtained and the clutch is given increased durability.

As a further improvement, the wedge of this present invention is provided on one side with a series of rollers intended to facilitate the movement of the clutching-wedge, said rollers being placed on that side of the wedge adjacent to the bottom of the recess containing the wedge, so that the wedge presents its broad surface to the opposite member of the clutch.

These and other features of my present device will be readily understood from the following description and the accompanying drawings.

In said drawings, Figure 1 is a perspective view of the two principal or engaging members of the clutch in their working relation, the shifting device for throwing the clutch into and out of engagement being shown in dotted lines and the shaft upon which the clutch is mounted being absent. Fig. 2 is a full view of the two engaging members of the clutch, the shaft carrying the same being shown in transverse section and a part of the plate which covers the sliding clutch-wedge by which the relatively-movable parts of the clutch are engaged with each other being broken away. Fig. 3 shows a fragment of the shaft in side view, with the members of the clutch and the shifter mounted thereon in axial section, taken through the key-seat of the member of the clutch which is fast on said shaft. Fig. 4 is a separate perspective view of the movable wedge by which the principal members of the clutch are engaged with each other. Fig. 5 is a transverse section of said wedge, showing a babbitted surface on the frictionally-engaging face thereof. Fig. 6 is a perspective view of the shifter detached. Fig. 7 is a cross-section of the wedge-shaped projection of the shifter, taken in line *y y* of Fig. 6. Fig. 8 is an enlarged fragmentary view of the clutch, showing more clearly the manner in which an expanding spring is applied to automatically throw the clutch-wedge into engaging action. Fig. 9 is a view corresponding to Fig. 2, but showing the clutch-wedge seated in a recess of the other member of the clutch. Fig. 10 is a vertical axial section of the clutch constructed as shown in Fig. 9.

Power may be applied to either member of the clutch and the other member thrown into engagement therewith by the devices to be described, so that the latter shall share the motion of the former.

For the purpose of this description, let A represent the fast or driving member of the clutch, and B the loose or driven part, C being a power-driven shaft, to which the member A is secured by a key, as shown, or otherwise, and having rotary motion in the direction indicated by the arrows.

D is a shifter supported movably on the shaft C and provided with a groove, $d$, or any other suitable or familiar configuration, by which it may engage with a shifting-lever for moving it lengthwise on the shaft in the usual manner, such lever not being here shown.

As here illustrated, the driving member A of the clutch projects into a recess or chamber, B', in the driven member B, as most plainly indicated in Figs. 3 and 10, the part A being fitted to rotate freely in the recess of the part B when the parts are not clutched by the devices to be described. As illustrated in Figs. 1, 2, 3, and 8, the driving member A of the clutch is provided with a tapering recess, A', formed in its periphery, said recess diverging or widening in the direction in which the member A rotates and given its tapering form by making its inner curved wall, $a$, eccentric to the axis of the clutch. Within this recess A' is fitted a wedge, E, having its outer surface on the curve of the adjacent surface of the clutch member B and its inner surface conformed to the inner wall of the recess A'. This wedge is of such lateral dimensions that when retracted into the wider part of the tapering recess A' it will clear or will not bear forcibly against the driven part B; but when forced toward the narrower end of said recess it will bear against the driven part of the clutch with such force as to give the latter motion with the driving part A, which is rotated directly by the shaft C. The clutch-wedge E is forced toward the narrower end of the tapering recess A' by means of a spring interposed between the wider end wall, $a^2$, of said recess and the adjacent end of the clutch-wedge, and the clutch is therefore normally in engagement. Disengagement of the clutch is effected by the insertion of the wedge-shaped projection D' of the shifter between the narrower end of the clutch-wedge and a shoulder on the part carrying the clutch-wedge at or beyond the narrower end of said clutch-wedge. The spring for throwing the clutch-wedge E is here shown as an expanding coiled spring, $e$, inserted in a recess, $a'$, in the radial wall $a^2$ of the recess A', the outer end of said coiled spring $e$ bearing against the wider end of the wedge E. The spring $e$ is shown as having its outer end filled with a wooden plug, $e'$, which tends to keep the protruding part of the spring straight or in line with the recess $e$, and therefore in position to be readily forced back into the said recess when the shifter-wedge is inserted.

As a separate improvement and to cause the clutch-wedge E to more promptly "bite," or, in other words, to move forward more freely, promptly, and certainly into driving engagement with the driven part of the clutch upon a full retraction of the shifter, a series of rollers or balls are provided upon the bearing-face of said clutch-wedge next the member of the clutch which carries it. As here shown, rollers E' are employed for this purpose. Being placed in the surface of the clutch-wedge opposite to that at which driving engagement is effected, they are not exposed to the friction which occurs just before and just after the wedge begins or ceases to be fully effective and while approaching and receding from its fully-effective position. By this location of the rollers they are therefore exempt from such wear as is calculated to impair their cylindric form. To accommodate and retain the rollers E', the wedge E is recessed, as shown at $e^2$, and less rollers are employed than will fill the recess. These rollers are pressed toward the forward or narrow end of the clutch-wedge by a spring or springs, as illustrated at $e^3$, a bar, $e^4$, concaved to fit the adjacent roller, being desirably inserted as a separate improvement between the rollers and the springs, as seen plainly in Figs. 4, 8, and 9. By this provision of a spring, $e^3$, the rollers are carried forward with the wedge by the forcing-springs $e'$ until they bear with considerable force against the surface of the adjacent part of the clutch, after which they roll backward as the clutch-wedge is further advanced by the action of said spring or by its engagement with the other part of the clutch. The rollers, being thus held forward by the springs $e^3$, have room in which to roll backward in such further advance of the clutch-wedge and facilitate the prompt action of the wedge.

The recess A is prolonged beyond the clutch-wedge or beyond the extreme point to which the narrower end of said clutch-wedge may advance, forming a recess, $A^2$, the inner wall of such prolongation being preferably concentric with the clutch-axis, as shown in Figs. 2 and 9. The end wall, $a^3$, of the recess $A^2$ remote from the clutch-wedge is inclined inwardly and backwardly toward the wedge, as also shown in said Figs. 2 and 9 of the drawings, and a correspondingly-inclined offset or groove, $a^4$, is provided at the remote end, $a^3$, or elsewhere in the inner wall of said recess. Into this recess $A^2$ enters the wedge-shaped projection D' on the shifter D, one edge, $d'$, of said projection D' being inclined to correspond with the inclination of the wall $a^3$ of said recess. The insertion of the shifter-wedge D' into the recess $A^2$ will therefore operate to force back the clutch-wedge E into the wider part of the recess A', thus releasing the wedge from frictional bearing on the driving member and throwing the clutch out of engagement.

To retain the shifter-wedge D' at the forward end of the recess $A^2$, and to therefore give free space for the advance of the clutch-wedge when the shifter-wedge shall be retracted, the said shifter-wedge D' is provided with an inclined flange or feather, $d^2$, which fits into the correspondingly-inclined groove $a^4$ of the recess $A^2$. To hold the shifter-wedge continually in position to enter the recess $A^2$, or, in other words, to insure the rotation of the shifter D with the fast member A of the clutch when the shifter is retracted entirely out of the recess $A^2$, as it may possibly at times be retracted, the said fast part A of the clutch is provided, as a separate improvement, with a projection, $A^3$, parallel with the shifter-wedge D', which has a continuation of the inclined wall $a^3$ and inclined groove $a^4$.

In Figs. 9 and 10 the clutch-wedge is illustrated as being seated in and carried by the outer member or shell, B, of the clutch. In this case it is the inner curved surface of the clutch-wedge that engages with the periphery of the driving member A (still assuming that power is applied to A) to give action to the clutch. In this case, also, the inclined feather $d^2$ is on the outside of the shifter projection D', and the inclined groove $a^4$, to receive the same, is correspondingly reversed in position.

If the driving-power be applied to the member B instead of A, its direction of motion will be opposite that indicated for the part A by the arrow, or the clutch-wedge will be oppositely arranged.

As a further and distinct improvement in the construction of the clutch-wedge, the friction-surface of the latter is babbitted. For this purpose the casting which forms said wedge is shown recessed in its outer surface, and, being placed in position between the parts of the clutch, or between parts having the same configuration, the Babbitt metal is poured through holes $e^5$ in the ends of the wedge communicating with the recess which receives the Babbitt. As a further improvement by which the clutch-wedge is better kept in place and its frictional action is improved, the circular wall of the member against which the plain face of the wedge bears is provided on its circumference with V-shaped grooves, as indicated at $b\ b$ of Fig. 3, and the wedge is provided with corresponding longitudinal ribs, $e^6$, as shown in Figs. 3, 4, and 5. By this means not only is the friction-surface contact of the wedge and opposing clutch member increased, but as the main surface of the wedge wears or the Babbitt thereon is compressed the V-shaped ribs exert a wedging action in the opposing grooves, and thus increase the tenacity with which the wedge holds upon the clutch.

I claim as my invention—

1. The combination, with independently-rotatable members of a clutch having adjacent surfaces, one of which is provided with a recess having a bottom wall inclined to the surface of the opposing clutch member, of a sliding wedge located in said recess, and a series of rollers arranged between the wedge and the bottom of the recess, substantially as described.

2. The clutch-wedge provided with a recess, $e^2$, in combination with the recessed member of the clutch, a series of rollers in the recess of the wedge, and a spring arranged between the rollers and a fixed part of the wedge, substantially as described.

3. The clutch-wedge provided with a recess, $e^2$, in combination with the recessed member of the clutch, a series of rollers in the recess of the wedge, a bar, $e^4$, bearing against the end roller of the series, and a spring interposed between said bar and an opposing surface of the wedge, substantially as described.

4. The combination, with the members of a clutch, one of which is provided with a recess having a bottom wall inclined to the surface of the opposing member, of a sliding wedge arranged in said recess and adapted to be moved therein into bearing against the surface of the opposing member of the clutch, a spring applied to throw the wedge into engagement with said opposing member of the clutch, and a shifter acting upon the wedge in opposition to the spring, substantially as described.

5. The combination, with the members of a clutch, one of which is provided with a recess, of a sliding wedge located in said recess, a spring located behind the wedge, and a wedge-shaped shifter acting between the smaller end of the wedge and an opposing surface of the recessed member of the clutch, substantially as described.

6. The combination, with the members of a clutch, one of which is provided with a recess, of a sliding wedge located in said recess, a spring located behind the wedge, and a wedge-shaped shifter acting against the smaller end of the wedge at one of its edges and provided at its opposite edge with a flange or feather, $d^2$, said recessed member of the clutch being provided with a groove engaged with said feather, substantially as described.

7. The combination, with the members of a clutch, one of which is provided with a recess, of a sliding wedge located in said recess and a wedge-shaped shifter acting against the smaller end of the wedge at one of its edges and provided at its opposite edge with a flange or feather, $d^2$, said recessed member of the clutch being provided with a projection, $A^3$, and with a groove, $a^4$, for engagement with the said feather extending outwardly through said projection, substantially as described.

In testimony that I claim the foregoing as my invention I affix my signature in presence of two witnesses.

WILLIS H. JOHNSON.

Witnesses:
A. B. McCONNELL,
ALFRED A. NORTH.